July 18, 1933. W. H. WORTHINGTON ET AL 1,918,580
INTERMITTENT CONTROL DEVICE
Filed April 11, 1930 4 Sheets-Sheet 2

INVENTORS
Wayne H. Worthington
and Lester G. Dueber
BY Arthur C. Brown
ATTORNEY

July 18, 1933.   W. H. WORTHINGTON ET AL   1,918,580
INTERMITTENT CONTROL DEVICE
Filed April 11, 1930    4 Sheets-Sheet 3

INVENTORS
Wayne H. Worthington
and Lester G. Dueber
BY Arthur de Brown
ATTORNEY

July 18, 1933.  W. H. WORTHINGTON ET AL  1,918,580
INTERMITTENT CONTROL DEVICE
Filed April 11, 1930   4 Sheets-Sheet 4

INVENTORS
Wayne H. Worthington
and Lester G. Dueber
BY Arthur C. Brown
ATTORNEY

Patented July 18, 1933

1,918,580

UNITED STATES PATENT OFFICE

WAYNE H. WORTHINGTON, OF BATTLE CREEK, MICHIGAN, AND LESTER G. DUEBER, OF MOUNT WASHINGTON, MISSOURI, ASSIGNORS, BY MESNE ASSIGNMENTS, TO GLEANER HARVESTER CORPORATION, OF INDEPENDENCE, MISSOURI, A CORPORATION OF DELAWARE

INTERMITTENT CONTROL DEVICE

Application filed April 11, 1930. Serial No. 443,492.

Our invention relates to an intermittent control device, and more particularly to a device of that character for intermittently controlling the clutch mechanism of a windrow harvester of the type described in the pending application of Wayne H. Worthington, Serial No. 407,390, the principal object of the present invention being to provide a control device which may be manually actuated by an operator located at a distance from the clutch mechanism.

In accomplishing this and other objects of the invention, we have provided improved details of structure, the preferred form of which is illustrated in the accompanying drawings, wherein.

Figure 1:
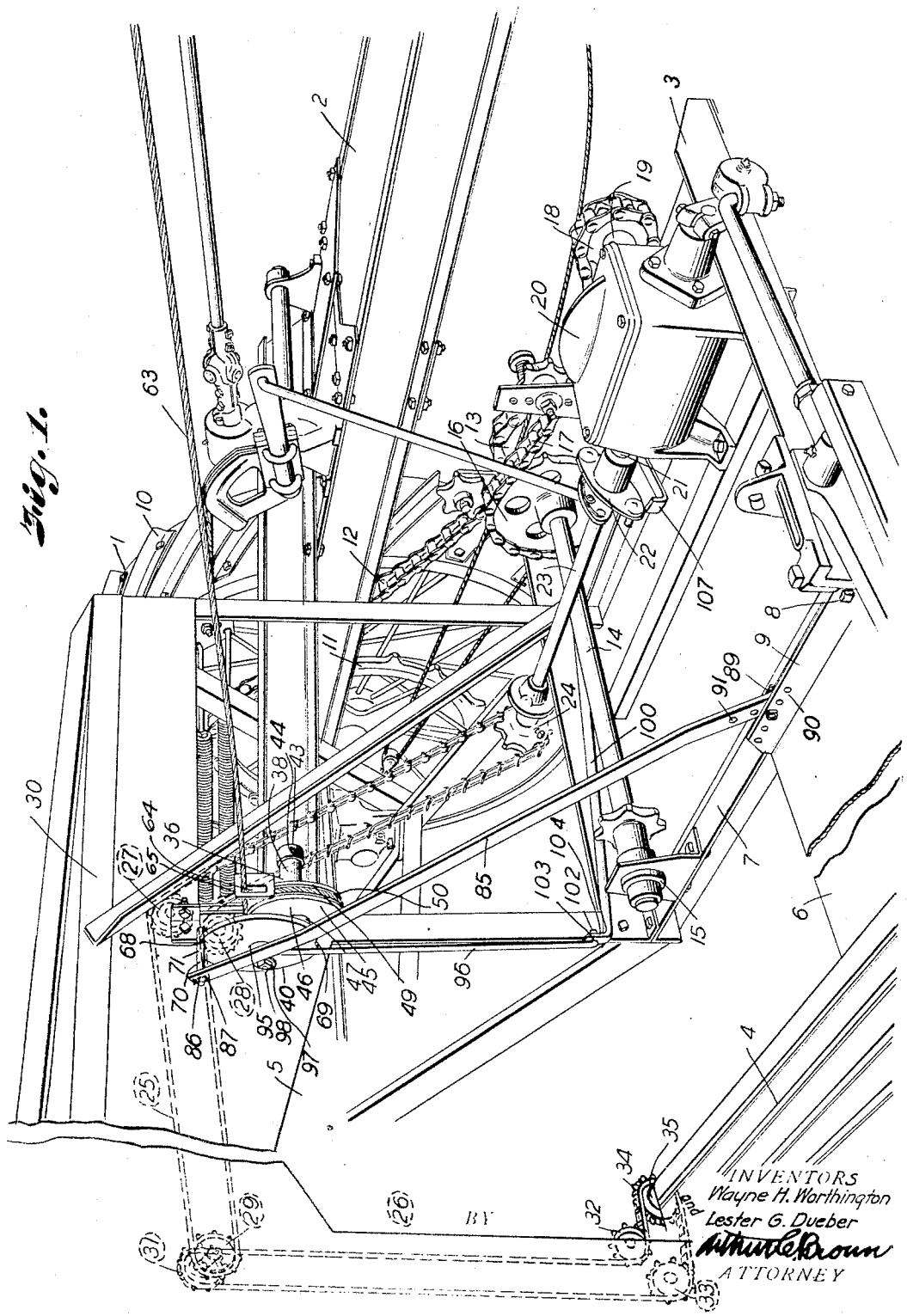
Fig. 1 is a detail perspective view of a portion of a windrowing machine equipped with a clutch control mechanism constructed in accordance with our invention.

Referring more in detail to the drawings:

1 designates a windrowing machine including a main frame 2, and a secondary frame 3 supported on the frame 1 and carrying a cutting unit including a conveyor 4 for discharging cut grain in a windrow through an opening 5 formed in the secondary framework of the machine at the end of the conveyor 4.

6 designates a stubble guard pivoted between cross members 7 of the secondary frame by bolts 8 extending through side flanges 9 on the guard and through the cross members, as illustrated in Fig. 1.

10 designates a main traction wheel for the machine having a sprocket 11 fixed thereto and carrying a chain 12 for driving a sprocket 13 on a power shaft 14 that is rotatably carried on the frame in bearings 15, as shown in Fig. 1. Also mounted on the power shaft is a sprocket 16 carrying a chain belt 17 for operating a sprocket 18 fixed on the shaft 19 of a transmission designated by the housing 20.

21 designates a power delivery shaft leading from the transmission, and connected with the power shaft by a clutch 22 is an aligning shaft 23 carrying a sprocket wheel 24 for operating the conveyor 4 through a pair of chains 25 and 26, the chain 25 running over the sprocket 24, a pair of idlers 27—28, and over a sprocket 29 mounted on the rear side of the vertical portion 30 of the frame 3.

The chain 26 runs over a sprocket 31 fixed in driving relation with the sprocket 29, over idlers 32—33, and over a sprocket 34 fixed on the roller shaft 35 of the conveyor 4, as illustrated diagrammatically in Fig. 1. With this arrangement, the conveyor, when operating, will discharge grain in a windrow but when the clutch is disengaged and the conveyor is idle, as when turning corners of the field or in passing over ravines and other places where it is not desired to deposit the windrow, the cut grain is retained on the conveyor.

Figure 2:
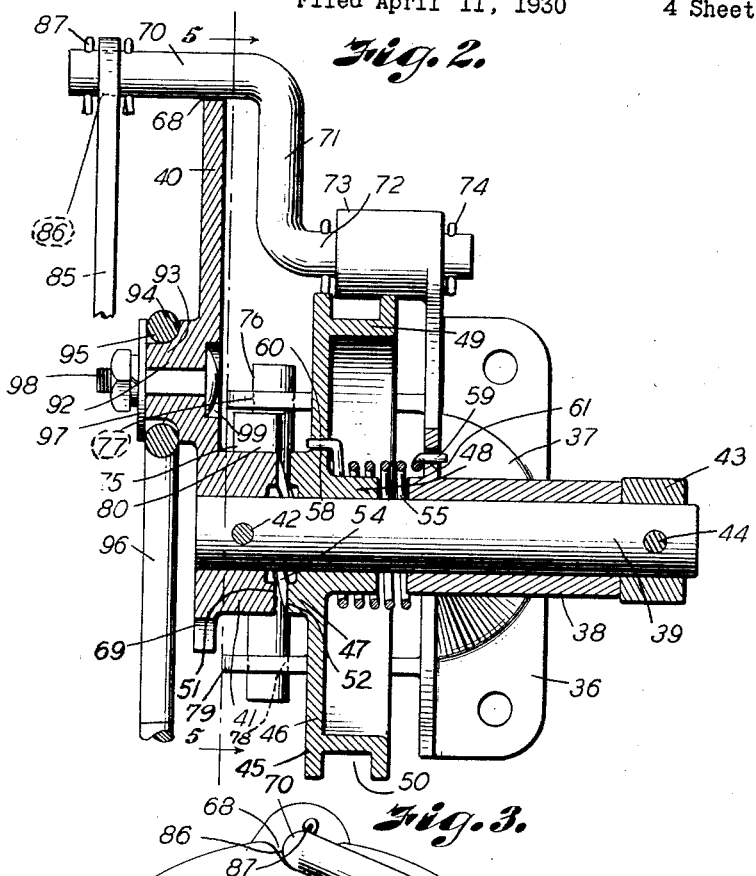
Fig. 2 is a longitudinal vertical sectional view through the control mechanism.

The clutch 22 may be actuated for controlling operation of the conveyor by mechanism preferably constructed as follows:

Fixed to the vertical framework 30 of the secondary frame 3 is a bracket 36 having a forwardly projecting arm 37 provided with a bearing sleeve 38 for rotatably mounting a shaft 39, as illustrated in Fig. 2. Mounted on one end of the shaft 39 and spaced from the bearing sleeve is an eccentric disk 40 having a laterally projecting hub 41 secured to the shaft 39 by a pin 42 extending through the hub and shaft, the shaft being retained from lateral movement in the bearing sleeve by a collar 43 fixed to the shaft by a pin 44 and engaging the outer end of the sleeve.

Rotatably mounted on the shaft 39 between the hub 41 and the bracket is a pulley 45 preferably including a disk or web portion 46 having laterally projecting hubs 47 and 48 on its opposite faces, and extending laterally from adjacent the periphery of the disk is an angle-shaped annular flange 49 providing a peripheral groove 50 for a purpose later described.

Formed on the face of the hub 41 of the eccentric disk is a clutch face 51 which is engaged by a complementary clutch face 52 formed on the pulley hub 47 so that when the pulley is rotated in an anti-clockwise direction as viewed from the right of Fig. 2, the disk is rotated therewith. The clutch faces 51 and 52 are preferably of the ratchet type and include radial stop shoulders 53 and inclined portions 54 so that when the pulley rotates in a clockwise direction as viewed from the right of Fig. 2, the stop shoulders on the pulley will ride over the cam faces of the clutch face 51 without rotating the disk.

In order to retain the clutch faces in yielding engagement with each other, we provide a coil spring 55 sleeved over the hub 48, and having one end bearing against the pulley and the other end bearing against the bracket 36, whereby tension of the spring retains the clutch face 52 in yielding engagement with the clutch face 51, and in order to retain the pulley in normal position, that is, in a position where a stop lug 56 projecting from the inner periphery of the flange 49 is in engagement with a stop lug 57 projecting from the bracket, we provide the ends of the spring with laterally bent portions 58 and 59 to extend through openings 60 and 61 formed in the pulley and bracket, respectively, so that when the pulley is rotated in an anti-clockwise direction as viewed from the right of Fig. 2, the spring will be radially tensioned to cause return movement of the pulley when released, as later described.

Forward rotation of the pulley is also limited by a stop lug 62 spaced circumferentially from the stop lug 56 and adapted to engage the under face of the stop lug 57 on the bracket when the pulley has been rotated its required amount in an anti-clockwise direction as viewed from the right of Fig. 2.

The pulley may be rotated by an operator on a propelling tractor through a flexible cable 63 extended through a guide slot 64 formed in a forwardly projecting arm 65 on the bracket 36, and extended through the groove 50 of pulley 46 with its inner end extended through an opening 66 in the base of the pulley groove and knotted to provide a stop 67.

Figure 3:
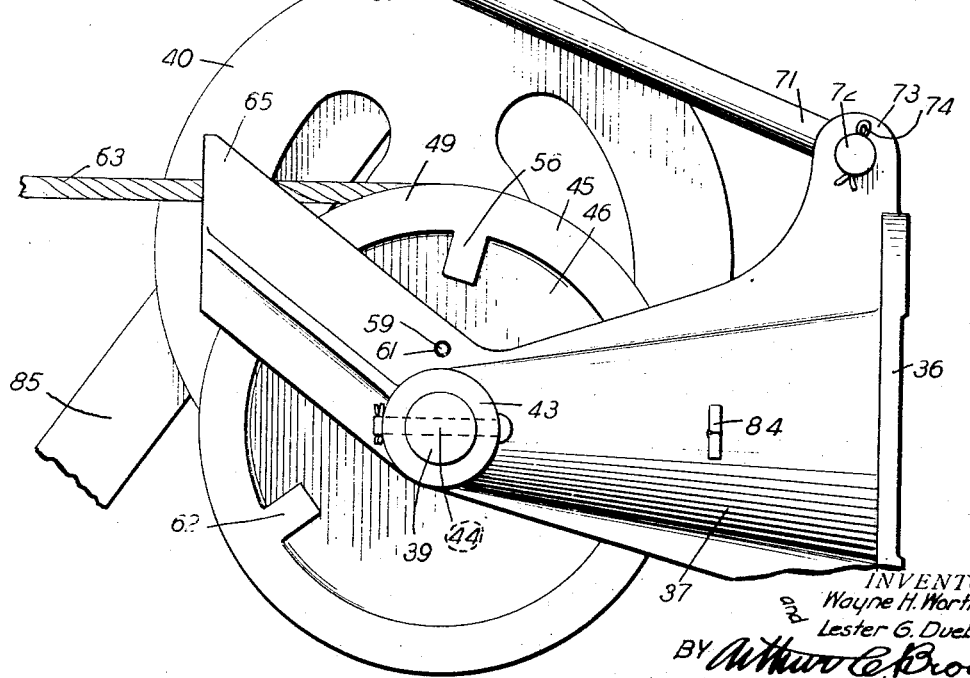
Fig. 3 is a side elevational view of the control mechanism.
Figure 4:
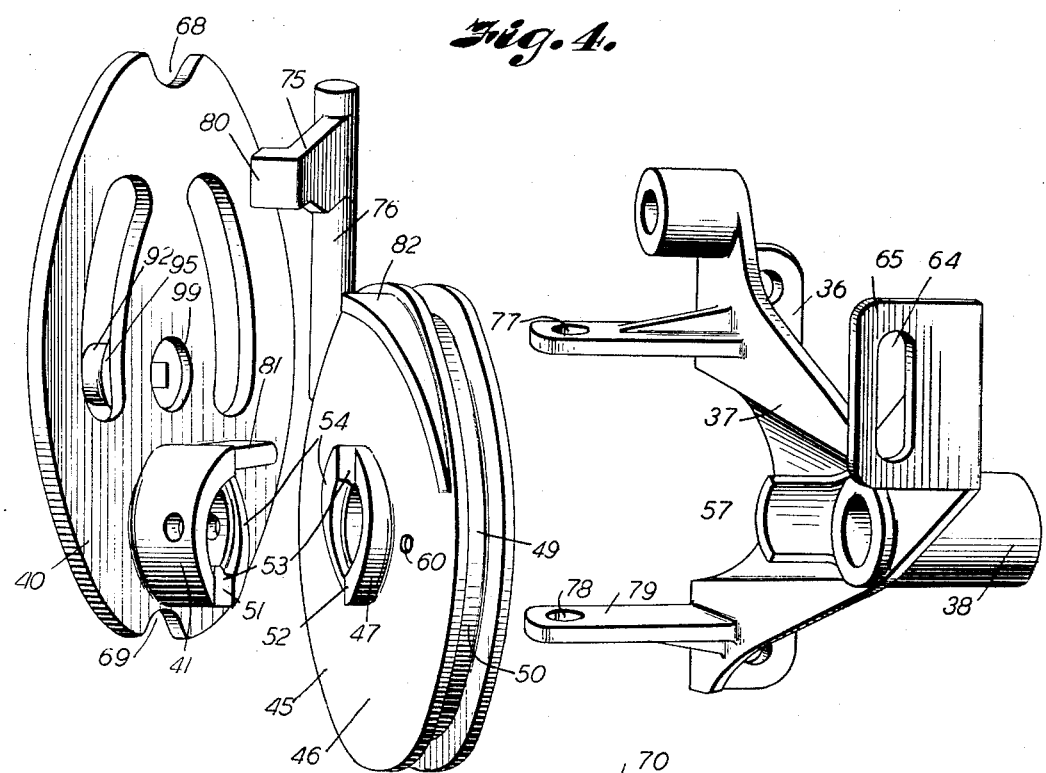
Fig. 4 is a disassociated perspective view of parts of the control mechanism.

Formed in the periphery of the eccentric disk in diametrical alignment with the hub 41, are notches 68 and 69 adapted to seat the arm 70 of a crank member 71 for latching the disk against rotation when the pulley is moving in a clockwise direction, Fig. 3. The crank member 71 preferably comprises a rod having oppositely bent end portions forming respectively the arm 70 and an arm 72 which is pivotally mounted in a sleeve 73 formed integrally with the rear portion of the bracket 36. The crank 71 is retained in the sleeve by cotter pins 74 extending through the arm 72 at opposite ends of the sleeve, as illustrated in Fig. 2.

For stopping the eccentric disk when the notches align with the arm 70, there is provided a pawl 75 formed on a vertical pivot member 76 which is carried in bearing openings 77 and 78 formed in the ends of the arms 79 which project inwardly from the bracket 36 towards the eccentric disk 40. The end of the pawl is provided with a laterally extending portion 80 adapted for engagement with a stop lug 81 projecting inwardly of the face of the disk 40 substantially tangent with its hub 54, so that when the disk is rotated and one of the notches 68 or 69 aligns with the arm, the pawl 75 is moved to engage the lug on the disk to stop its rotation.

The pawl 75 is automatically moved into position to be engaged by the lug 81 by an inclined arcuate cam 82 formed adjacent the periphery of the pulley 45 so that just before the lug 81 comes into alignment with the projecting end 80 of the pawl the cam 82 cams the pawl into position to engage the lug for stopping rotation of the disk when one of the notches is then in position for receiving the arm 70.

Figure 5:
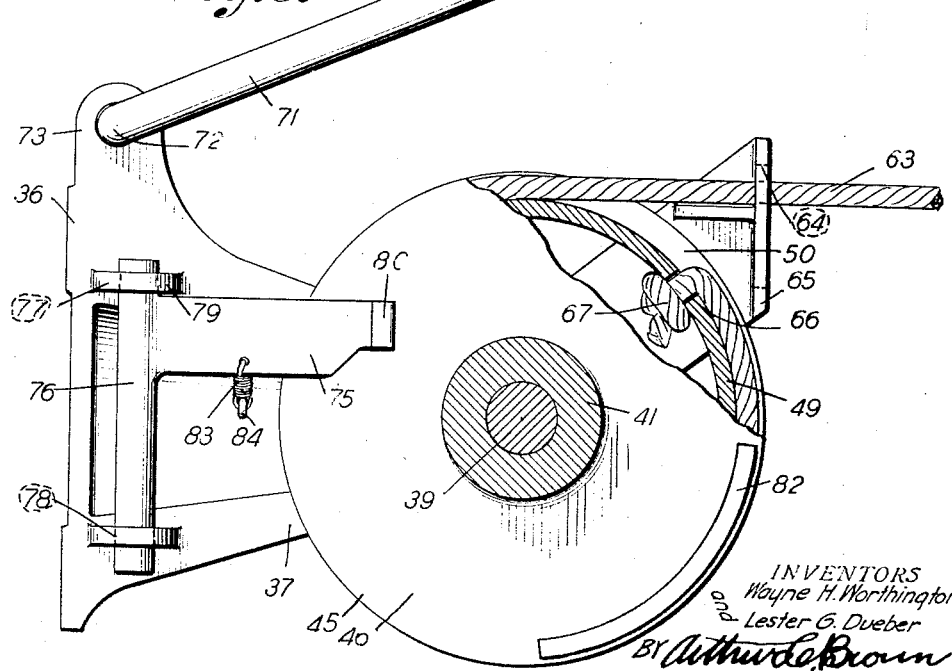
Fig. 5 is a vertical sectional view on the line 5—5, Fig. 2.
Figure 6:
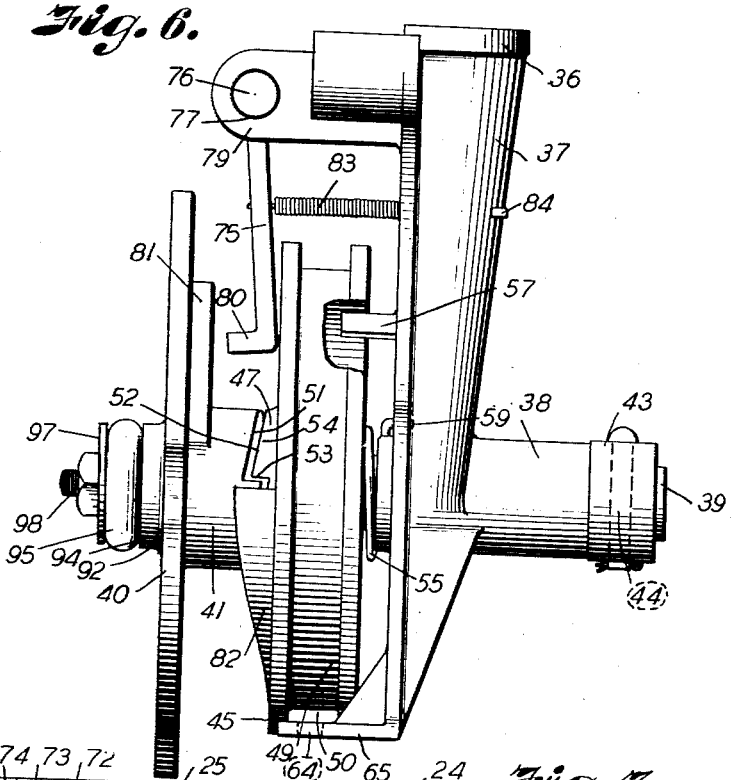
Fig. 6 is a plan view of the control mechanism.

As soon as the operator releases the cable and the pulley is returned to normal position by the spring, the pawl moves away from the lug under influence of a coiled spring 83 having one end attached to the lug and the other end to an eye 84 carried by the bracket, as illustrated in Figs. 5 and 6.

The stubble guard is raised by the eccentric disk through a link 85 having an opening 86 in its upper end to receive the projecting end of the arm 70 which is retained on the link by cotter pins 87 extending through the arm and engaging opposite sides of the link. The link extends downwardly and forwardly of the machine and is adjustably connected to the stubble guard by a bolt 89 extending through one of a series of openings 90 formed in the flange 9 of the guard, and one of a plurality of openings 91 formed in the end of the link, whereby the angle of the guard may be adjusted with relation to the framework of the machine. Thus it is apparent that when the disk is rotated so that the crank arm seats in the notch 68, the disk raises the stubble guard to the position shown in Fig. 1, and when the disk is rotated so that the crank arm is received in the notch 69, the guard is lowered to functional position due to the eccentric mounting of the disk on the shaft 39.

Projecting eccentrically from the outer face of the disk 40 is a hub 92 having a reduced extension 93 forming a shoulder 94, and mounted on said extension is the eye 95 of a link 96, which is retained on the extension by a washer 97 having a keeper bolt 98 extended through the hub and through an opening in the washer with its head seated in a recess 99 in the inner face of the disk.

The lower end of the link 96 extends downwardly to the horizontal portion of the frame 7 and is there connected with the laterally extending arm 100 of a rock shaft 101 by a hook 102 which extends into an opening 103 in an ear 104 formed on the end of the shaft arm.

Figure 7:
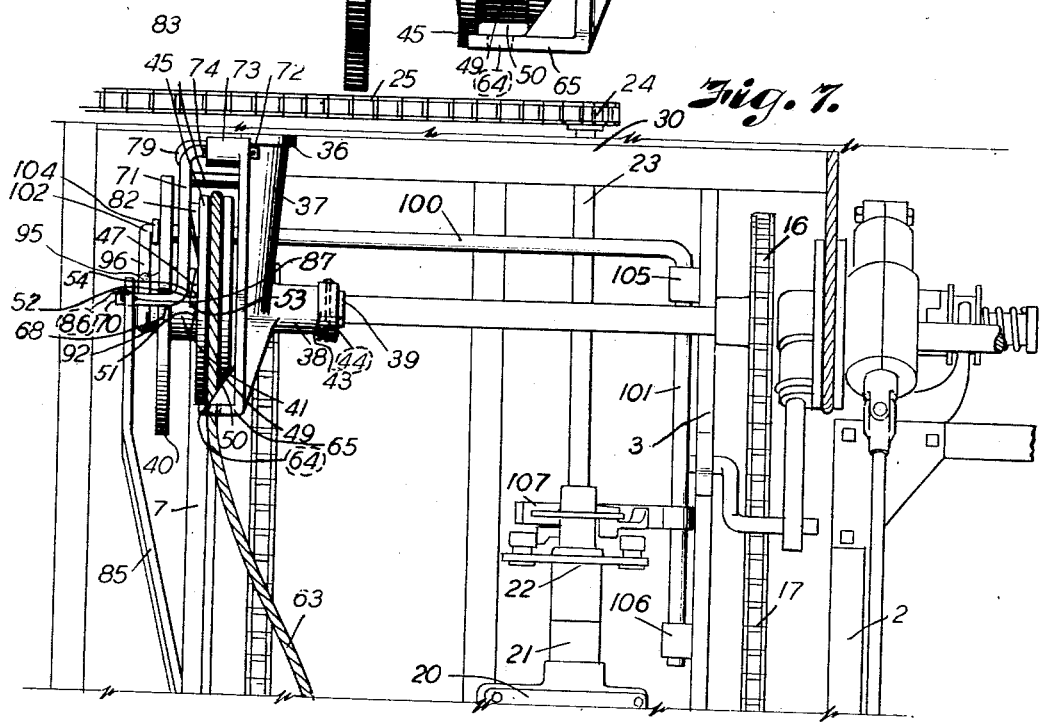
Fig. 7 is a plan view of a portion of the windrowing machine illustrated in Fig. 1.

The shaft 101 is mounted in bearings 105 and 106 carried by the frame 7 as shown in Fig. 7, and fixed to the shaft in alignment with the clutch of power shaft 23 is a clutch releasing arm 107 adapted to engage the clutch and stop rotation of the power shaft and thus stop the conveyor 4.

To start the conveyor, the operator pulls the cable 63 to rotate the pulley in a clockwise direction (Fig. 5), thereby rotating the eccentric disk 40 to lower the arm 70 from the position shown in Fig. 1, thereby lowering the stubble guard into functional position and causing the clutch arm 107 to free the clutch, whereupon the clutch drives the shaft 23 and the conveyor 4 for discharging cut grain to form a windrow.

Upon release of the cable 63 the spring 55, which has been tensioned upon forward rotation of the pulley, retracts the pulley to normal position, that is with the stop lug 56 engaging the stop lug on the bracket. In returning to normal position, the clutch faces on the pulley ride over the inclined faces of the hubs, leaving the disk 40 in position for supporting the arm 70 in the notch 68.

To stop the conveyor the operator again pulls the cable to rotate the pulley in a forward direction, thereby rotating the disk 40 to move the notch 68 out of engagement with the arm 70. The arm then rides on the periphery of the disk until it enters into engagement with the notch 69, at which time the cam 82 moves the pawl 75 into position to engage the lug 81, stopping rotation of the disk and allowing the arm 70 to seat in the notch 69. Release of the cable permits the pulley to be returned by the spring, and restore the control mechanism for further operation as heretofore described.

While we have illustrated and described our improved clutch as applied to a harvesting machine, we do not wish to limit its use to any particular purpose as it may be employed in other combinations without departing from the spirit of the invention.

What we claim and desire to secure by Letters Patent is:

1. In a device of the character described, a support, a rotative member associated with the support, means on the support for limiting rotation of the rotative member, an actuator for rotating said rotative member, means mounting the actuator on the support, means on the actuator for rendering said limiting means effective, and clutch means operably connecting the actuator with the rotative member.

2. In a device of the character described, a support, a rotative member associated with the support, means on the support for limiting rotation of the rotative member, an actuator for rotating said rotative member, means mounting the actuator on the support, means on the actuator for rendering said limiting means effective, clutch means operably connecting the actuator with the rotative member, means fixed to the actuator for operating the actuator in one direction to actuate the rotative member, and a second means connected with the actuator for returning the actuator to its former position.

3. In a device of the character described, a support, a reciprocating member operable with relation to the support, a rotative member movably associated with the support to actuate the reciprocating member, an actuator for rotating the rotative member, means mounting the actuator on the support, a stop member on the rotative member, means on the support for engaging the stop member to limit rotation of the rotative member, and means on the actuator for rendering said stop engaging means effective.

4. In a device of the character described, a support, a reciprocating member operable with relation to the support, a rotative member movably associated with the support to actuate the reciprocating member, an actuator for rotating the rotative member, a stop member on the rotative member, means mounting the actuator on the support, means on the support for engaging the stop member to limit rotation of the rotative member, and a cam on the actuator for rendering said stop engaging means effective.

5. In a device of the character described, a support, a reciprocating member operable with relation to the support, a rotative member movably associated with the support to actuate the reciprocating member, an actuator for rotating the rotative member, means mounting the actuator on the support, a stop member on the rotative member, means on the support for engaging the stop member to limit rotation of the rotative member, means operably connecting the actuator with the rotative member, and means on the actuator for rendering said stop engaging means effective.

6. In a device of the character described, a support, an eccentric member, means rotatably mounting the eccentric member on the support, means on the support for limiting rotation of the eccentric member, an actuator carried from the support, means on the actuator for rendering said limiting means effective, clutch means operably connecting the actuator with the eccentric member, means connected with the actuator for rotating the actuator in one direction to move the eccentric member, and means connected with the actuator for returning the actuator to its former position.

7. In a device of the character described, a support, an eccentric member, means rotatably mounting the eccentric member on the support, an actuator carried from the support for rotating the eccentric member, clutch means connecting the eccentric member with the actuator, means connected with the actuator to move the actuator in one direction to move the eccentric member, a latch, means mounting the latch on the support, means on the actuator for moving the latch to stop rotation of the eccentric member, and means connected with the actuator for returning the actuator to its former position.

8. In a device of the character described, a support, an eccentric member, stop means on the eccentric member, means rotatably mounting the eccentric member on the support, an actuator carried from the support for rotating the eccentric member, clutch means connecting the eccentric member with the actuator, means connected with the actuator to move the actuator in one direction to move the eccentric member, a latch, means mounting the latch on the support for engaging said stop means, a cam on the actuator to move the latch into position to engage said stop means, and means connected with the actuator for returning the actuator to its former position.

9. In a device of the character described, a support, an eccentric member, means for rotatably mounting the eccentric member on the support, a projecting lug on the eccentric member, an actuator carried from the support, clutch means operably connecting the actuator with the eccentric member to move the eccentric member therewith, a pawl, means pivotally mounting the pawl on the support for engaging the lug on the eccentric member, a cam on the actuator to move the pawl into engagement with the lug for stopping rotation of the eccentric member, and means connected with the actuator for returning the actuator to its normal position.

10. In a device of the character described, a supporting bracket, an eccentric disk carried on the bracket and having a notch, a lug on the eccentric disk, a crank member, means pivotally mounting the crank member on the support, an arm on the crank member arranged to engage the eccentric disk and adapted to engage in the notch, a pulley supported on the bracket, a cable wound on the pulley for operating the pulley, clutch means connecting the pulley with the eccentric disk upon rotation of the pulley to bring the notch into position for engaging said arm in the notch, a latch member, means pivotally mounting the latch member on the bracket for engaging said lug, and means on the pulley for pivoting the latch into position to engage the lug to stop movement of the eccentric disk when the arm has engaged the notch.

11. In a device of the character described, a supporting bracket, an eccentric disk carried on the bracket and having a notch, a lug on the eccentric disk, a crank member, means pivotally mounting the crank member on the support, an arm on the crank member arranged to engage the eccentric disk and adapted to engage in the notch, a pulley supported on the bracket, a cable wound on the pulley for operating the pulley in one direction, clutch means connecting the pulley with the eccentric disk upon rotation of the pulley to bring the notch into position for engaging said arm and the notch, a latch member, means pivotally mounting the latch member on the bracket for engaging said lug, means on the pulley for pivoting the latch into position to engage the lug to stop movement of the eccentric disk when the arm has engaged the notch, and a spring having one end anchored to the pulley and its other end anchored to the bracket for moving the pulley in the opposite direction.

WAYNE H. WORTHINGTON.
LESTER G. DUEBER.